(12) United States Patent
Mogalayapalli et al.

(10) Patent No.: US 8,291,059 B2
(45) Date of Patent: Oct. 16, 2012

(54) METHOD FOR DETERMINING A BUSINESS CALENDAR ACROSS A SHARED COMPUTING INFRASTRUCTURE

(75) Inventors: Murali Mogalayapalli, Novi, MI (US); William Noble, South Lyon, MI (US); Bryce Dunn, Royal Oak, MI (US)

(73) Assignee: Compuware Corporation, Detroit, MI (US)

( * ) Notice: Subject to any disclaimer, the term of this patent is extended or adjusted under 35 U.S.C. 154(b) by 250 days.

(21) Appl. No.: 12/814,749

(22) Filed: Jun. 14, 2010

(65) Prior Publication Data

US 2011/0307590 A1    Dec. 15, 2011

(51) Int. Cl.
*G06F 15/173* (2006.01)
(52) U.S. Cl. ..... 709/223; 709/225; 709/231; 370/395.4; 725/46; 701/31.4; 706/19
(58) Field of Classification Search .................. 709/223
See application file for complete search history.

(56) References Cited

U.S. PATENT DOCUMENTS

| | | | |
|---|---|---|---|
| 2002/0143979 A1* | 10/2002 | Douceur et al. | 709/231 |
| 2004/0047351 A1* | 3/2004 | Del Prado Pavon et al. | 370/395.4 |
| 2009/0327491 A1* | 12/2009 | Tran et al. | 709/225 |

* cited by examiner

*Primary Examiner* — Hua Fan
(74) *Attorney, Agent, or Firm* — Harness, Dickey & Pierce, PLC

(57) ABSTRACT

A method of scheduling availability for a computing infrastructure in a shared computing environment is disclosed. The method comprises assigning a new schedule of service to a software application in the computing environment, propagating the new schedule of service assigned to the software application to a plurality of computing components that support the software application, where the computing infrastructure is comprised of the plurality of computing components having a hierarchical relationship with each other, and determining a schedule of service for a given computing component in the computing infrastructure by aggregating schedules of service propagated to the given computing component.

15 Claims, 12 Drawing Sheets

METHOD FOR DETERMINING A BUSINESS CALENDAR ACROSS A SHARED COMPUTING INFRASTRUCTURE

FIELD

The present disclosure relates to a method for determining a business calendar across a shared computing infrastructure.

BACKGROUND

This section provides background information related to the present disclosure which is not necessarily prior art.

Companies that have distributed or web-based applications often have a variety of tools that collect data about the performance of these applications. Specifically, tools are used to measure the end-user response time of the applications, along with multiple metrics on the web servers, application servers, databases, and the physical servers that host the applications or application components. Metric data collected includes Quality of Service, CPU utilization, disk I/O rates, TCP transmission errors, etc. Performance management tools generally provide reports on the metrics being collected, but they do not automatically show the software services, metrics, hardware devices and other computing infrastructure related to the application experiencing a particular problem, or how the problem affects an agreed upon schedule of service. The user is forced to manually sift through volumes of data with the required a priori knowledge of how the applications and services are related.

Furthermore, a web-based application may be served to an end terminal or another application from one or more physical servers, which may be located in a larger computing infrastructure. Thus, it is desirable for a user to be able to see when the various components of the infrastructure are being used. For instance, if an application is being served according to a predetermined schedule by a plurality of servers in a server bank, it can be useful to allow the user to see which servers and/or server banks are serving the application and when they are serving the application.

Additionally, if the software application is being served to a customer, the schedule of service may be defined by a service level agreement (SLA), which defines a minimum threshold of quality of service that must be maintained at specific times. These schedules may also have priorities such as peak and non-peak service times of the software application. As can be appreciated, it may be advantageous to allow the user to know when a particular component of the computing infrastructure must be available to adhere to the SLA governing the service of the software application.

Therefore, it is desirable to provide a method for propagating a schedule of service throughout a service model representing the computing infrastructure so that a user can determine which components must be available at what times. Thus, when the user identifies a cause of a performance problem experienced by an application in a computing environment, the user can easily identify other components that are not in use so that a breach of the SLA may be avoided.

SUMMARY

This section provides a general summary of the disclosure, and is not a comprehensive disclosure of its full scope or all of its features.

In one aspect of the disclosure, a method of scheduling availability for a computing infrastructure in a shared computing environment is disclosed. The method comprises assigning a new schedule of service to a software application in the computing environment, propagating the new schedule of service assigned to the software application to a plurality of computing components that support the software application, where the computing infrastructure is comprised of the plurality of computing components having a hierarchical relationship with each other, and determining a schedule of service for a given computing component in the computing infrastructure by aggregating schedules of service propagated to the given computing component.

In another aspect of the disclosure, a method of scheduling service for a computing infrastructure in shared computing environment is disclosed. The method comprises receiving a service model comprising an application graph having application nodes defining a hierarchy of applications and an infrastructure graph having infrastructure nodes defining a hierarchy of computing components, wherein an application node in the application graph links to an infrastructure node in the infrastructure graph that supports the application. The method further includes receiving a schedule of service for an application represented by an application node in the application graph and assigning the schedule of service to the application node representing the application. The method further comprises propagating the schedule of service to an infrastructure node representing a computing component in the infrastructure graph and propagating the schedule of service to a different node in the infrastructure graph.

In another aspect of the disclosure, A method for scheduling availability of a computing infrastructure in a shared computing environment is disclosed. The method includes receiving a service model comprising an application graph having application nodes defining a hierarchy of applications and an infrastructure graph having infrastructure nodes defining a hierarchy of computing components, wherein an application node in the application graph links to an infrastructure node in the infrastructure graph via a link node. The method further includes receiving a schedule of service for an application represented by an application node in the application graph, wherein the schedule of service indicates a time when the application is available to a user and a priority of the application and assigning the schedule of service to the application node representing the application. The method further includes propagating the schedule of service to an infrastructure node representing a computing component in the infrastructure graph according a predetermined rule, wherein the schedule of service is propagated to the infrastructure node via the link node and propagating the schedule of service to a different node in the infrastructure graph according to the predetermined rule.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
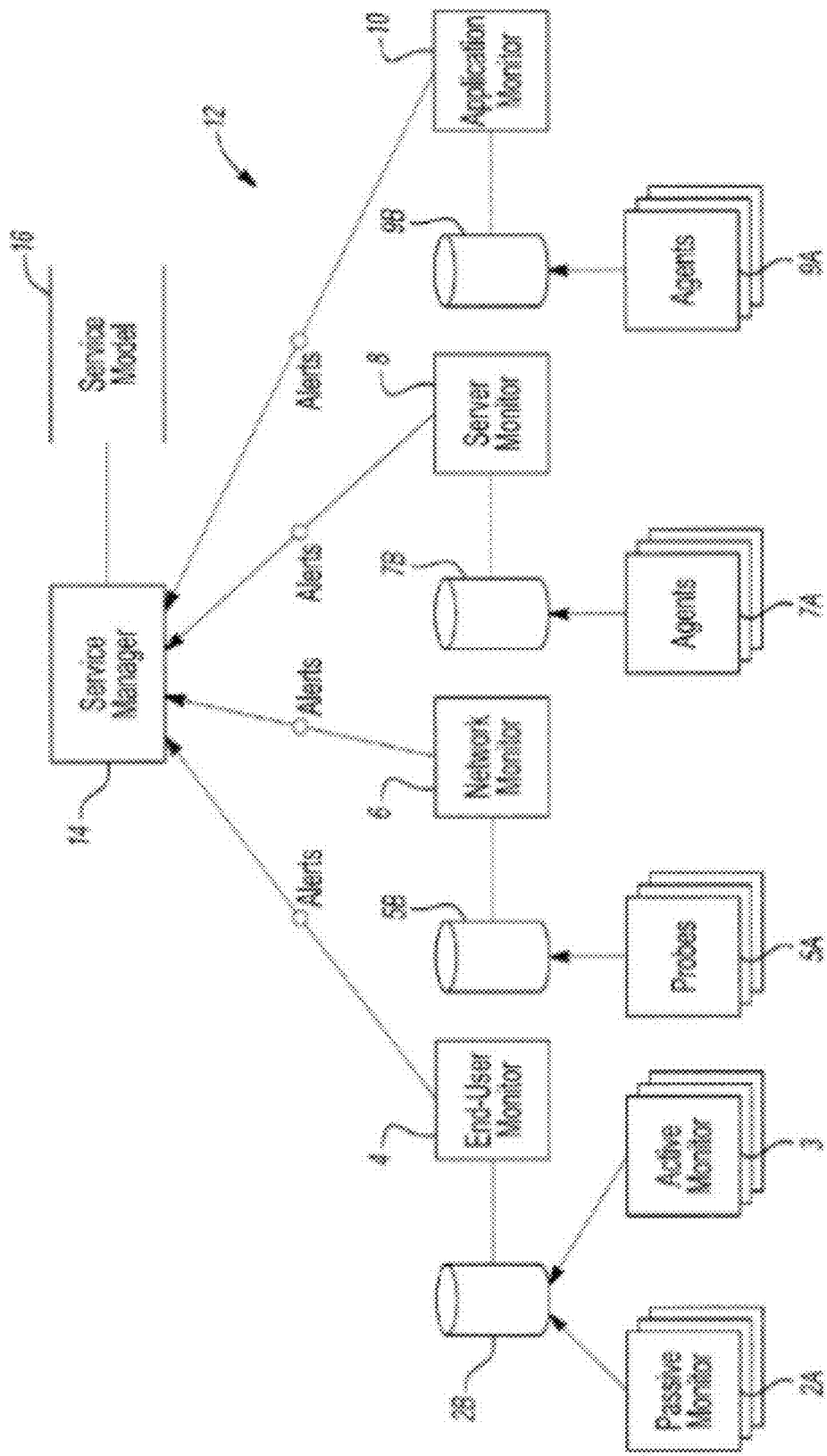
FIG. 1 is a diagram depicting an exemplary performance monitoring tool.

FIG. 1 depicts an exemplary performance management tool 12 that monitors performance of software applications in a computing environment. The performance management tool may be comprised generally of a service manager 14, a service model 16, and a plurality of different monitoring tools 18. The performance management tool 12 may include other components. It is appreciated that the performance management tool 12 can be embodied as computer readable instructions residing on a computer readable medium, such that the computer readable instructions are executable by a processor.

The Vantage® software product commercially available from Compuware Corporation is an exemplary performance management tool. While the following description is provided with reference to the Vantage® software product and accompanying software offerings, it is readily understood that the teachings of this disclosure are applicable to other performance management tools, such as Foglight® from Quest Software® and ITCAM from IBM®. Moreover, it is understood that the Vantage software product may be interfaced with monitoring tools from other third party vendors.

The service manager 14 processes and distills data from disparate sources to a present real-time view of quality and performance of software applications which comprise an enterprise's computing environment. Data may be gathered using different types of monitoring tools 18 as will be further described below. The service manager 14 relies upon a service model 16 residing in a data store to understand the relationship between the data and a given application. More specifically, the service model 16 is a data structure that maps software applications in the computing environment to the respective computing components that support the software applications. The service manager 14 then uses a dashboard concept to present service quality and performance indicators on a graphical user interface for each of the applications being monitored.

End-user monitoring may be accomplished using one of two methods. Agentless monitoring measures application response times experienced by each user of an application as well as other related performance metrics. In this approach, monitoring software 2A passively collects data anywhere in the network from one or more centralized locations. In other words, the monitoring software does not reside on the end-users computing device. The monitoring software 2A in turn stores the collected data in a database 2B associated with the tool. Such end-user monitoring software is available with the Vantage product offering.

Active monitoring gauges response times for applications using monitoring software that typically resides on the end-users computing device or on a dedicated workstation. The monitoring software 3 simulates user experiences using synthetic transactions, thereby providing "control" measurements that are especially important for assuring performance when actual usage is low. Likewise, the collected data may be stored in database 2B for subsequent reporting and analysis. The ClientVantage® software available with the Vantage® product offering is an example of this type of monitoring tool.

Network monitoring tools monitor traffic on an enterprise's network. Network probes 5A are placed at different locations in the network. Each probe is a software component that passively collects data which may be used to derive performance metrics such as network throughput, bandwidth utilization, total bytes sent, server response time, etc. Other network performance related metrics are also contemplated by this disclosure. The collected data is then stored in a database 5B. The network monitoring tool may further include a software analysis component 6 that analyzes and compiles the data for subsequent reporting. The NetworkVantage software available with the Vantage product offering is an example of this type of monitoring tool.

Server monitoring tools monitor metrics for physical servers (i.e., the hardware). Software agents 7A are placed on each of the devices being monitored. The software agents 7A collect data which may be used to derive performance metrics such as CPU utilization, memory utilization, disk space availability and other server related performance metrics. The collected data is then stored in a database 7B. The server monitoring tool may further include a software analysis component 8 that analyzes and compiles the data for subsequent reporting. The ServerVantage software available with the Vantage product offering is an example of this type of monitoring tool. Microsoft's Operations Manager ® is a comparable server monitoring tool.

Application performance monitoring tools monitor the performance and service availability of software applications running on physical servers. Software agents 9A are placed on the physical servers which host the software applications. The software agents 9A collect data which may be used to derive performance metrics including CPU utilization by an application, memory utilization by an application or other application related performance metrics. The collected data is then stored in a database 9B. The application performance monitoring tool may further include a software analysis component 10 that analyzes and compiles the data for subsequent reporting. The VantageAnalyzer software available with the Vantage product offering is an example of this type of monitoring tool. Computer Associates'® Wily Customer Experience Manager is a comparable application performance monitoring tool.

The service manager 14 is also configured to receive the service model 16 and a schedule of service for one or more software applications in the service model 16. A schedule of service indicates when a particular software application is available to a client, e.g. a user or another application. For instance, a particular application may be available from 8:00AM to 5:00PM. Additionally, the schedule of service may also indicate different priorities during the day. For instance, the particular application may be available in "non-peak" from 6:00 AM to 8:00AM, in "peak" from 8:00AM to 5:00PM and "non-peak" from 5:00PM to 7:00PM. The service manager 14 propagates the schedule of service to other components in the service model 16. For example, if the particular application is served by a particular server, then a component in the service model 16 representing the application inherits the schedule of service of the application. The service manager 14 is configured to receive the schedules of service for a plurality of applications and to propagate the schedules for the plurality of applications to the computing components used to execute the applications. The service manager 14 may also generate a business calendar tree, which indicates the schedules of the various computing components and software applications with respect to the schedule of service.

Figure 2:
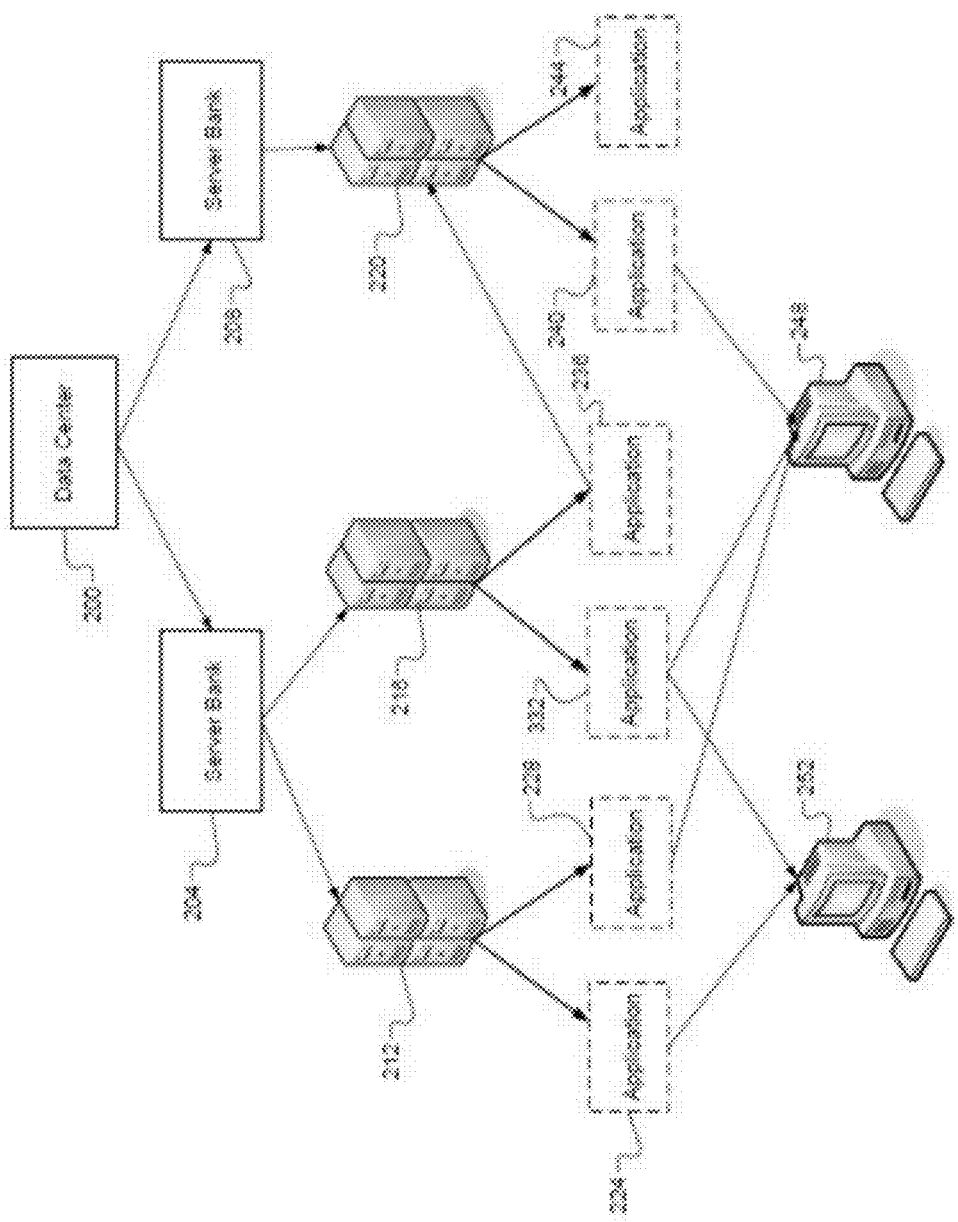
FIG. 2 is a diagram illustrating exemplary components of an exemplary computing infrastructure.

FIG. 2 shows an example of a hierarchy of computing components and applications hosted thereon. The example provided is only provided for example. The hierarchy depicted therein is in no way intended to be limiting. As can be seen, a data center 200 may have two server banks 204 and 208. In this example, server bank 204 has two servers 212 and 216. Server 212 hosts two applications 224 and 228. Similarly, server 216 hosts two applications 232 and 236. Server bank 208 includes a server 220, which hosts applications 240 and 244. As can be seen, the applications may be served to end terminals 252 and 248, or may be served to other applications or servers. Further, it is envisioned that the foregoing may be much more complex, with additional components and additional layers. For instance, a plurality of server banks may be dedicated to performing a particular service, such as a web server or an application server.

Figure 3:
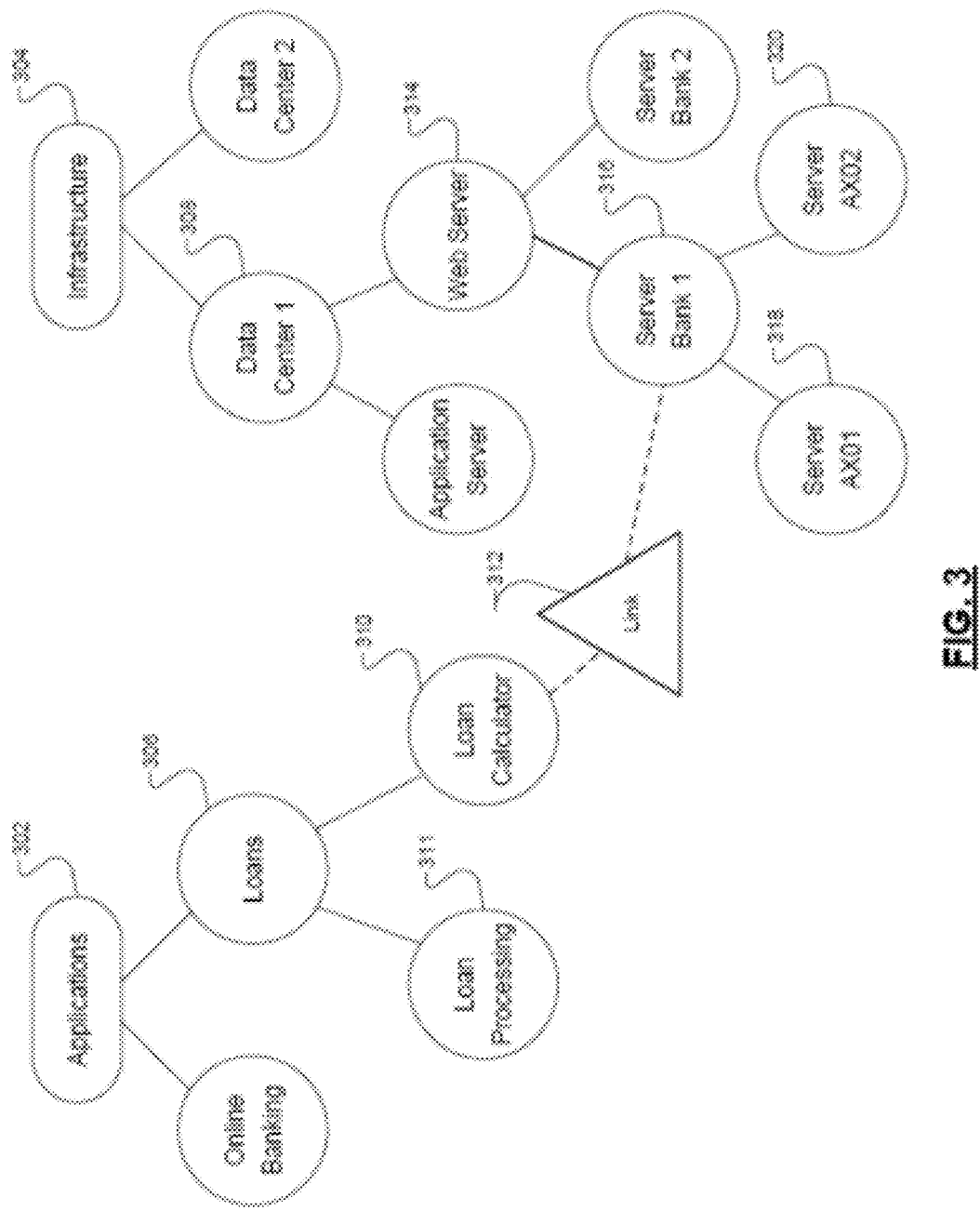
FIG. 3 is a diagram of an exemplary service model which may be employed by a performance management tool.

As mentioned, the foregoing applications and infrastructure can be represented by a service model. FIG. 3 illustrates an exemplary service model 300 which may be employed by the service manager 14. The service model 300 defines the relationship between entities in an enterprise's computing environment and, more particularly, links an enterprise's business services to the supporting information technology infrastructure. The service model 300 may be represented by an acyclic connected graph data structure. Other data structures for defining the service model are also within the broader aspects of this disclosure. For instance, a tree, a directed graph, a directed acyclic graph or any other type of graph may be used to define the service model 300.

In an exemplary embodiment, the service model includes an application tree having an application root node 302 and an infrastructure tree having an infrastructure root node 304. While the application hierarchy and infrastructure hierarchy are described as trees, it is appreciated that the application hierarchy and computing hierarchy may be defined as directed acyclic graphs as well, wherein a node may have more than one parent. For purposes of explanation only, the application and infrastructure hierarchies will be described in the context of trees.

The computing infrastructure in the infrastructure tree represent the computing components that support the applications. The hierarchy for the branches extending from the root nodes may include more or less intermediate nodes depending upon the complexity and requirements of the enterprise. Other types of root nodes may also be included in the tree structure. For instance, locations (not shown) of the users of the applications may also be represented by the service model 300.

Branches extending from the application root node 302 represent the hierarchy of the software application, with the leaf nodes representing the application software available to end users or other applications. Furthermore, it is appreciated that the application nodes may be categorically organized. For instance, in the example provided a loan application bundle may be represented by a node 306 and the applications comprising the loan application bundle, e.g. a node 310 representing a loan calculator and a node 311 representing a loan application processing application.

Branches extending from the infrastructure root node 304 represent the hierarchy of computing components that comprise the computing environment, including web servers 314, application servers, databases, mainframe computers, network components, etc. It is appreciated that in this example, the web server may be comprised of one or more server banks 316. The server bank 316 may be comprised of one or more physical servers 318 and 320. As can be appreciated the physical servers 318 and 320 may support software services, which are not represented in this particular service model 300 but may be in other service models.

The service model 300 may further include one or more links that link the application tree to the infrastructure tree. In some embodiments the link may be a link node. As can be appreciated, a link node is considered a parent node to either an infrastructure node or an application node. Alternatively, the link may be represented by a pointer from an application node to infrastructure node, or vice versa. The link 312 indicates a relationship between computing component or components that are used to serve the application. Namely, the link 312 may show where an application may be executed or supported by a computing component. Thus, in the example provided in FIG. 3, the loan calculator is hosted by server bank 316. It follows that the physical servers in server bank 316 may also support the loan calculator. It is appreciated that the link 312 could link to other nodes located at different levels in the infrastructure tree. For example, the link 312 could link to a physical server node 318. Furthermore, it is appreciated that more than one application node may be linked to an infrastructure node. It is appreciated that a link is one way to identify the relationship between an application and the computing infrastructure. It is envisioned other techniques can be implemented to signify this relationship.

The foregoing is but an example of a service model. It is envisioned that other means of expressing the relationship between applications and a computing infrastructure are within the scope of this disclosure. The service model, or equivalent thereof, can be generated by a user, such as an IT specialist, or the service model can be generated automatically.

As discussed above, applications may have a schedule of service associated therewith. The schedule of service may be defined from a contractual agreement, such as a service level agreement (SLA). The schedule of service may define the times when the application is available to the licensee and what priorities the application has at specific times. For instance, an application may be available during standard business hours, e.g. 9:00 AM-5:00 PM, at "peak" service, and during pre-business and post-business hours, e.g. 8:00 AM-9:00 AM and 5:00 PM-6:00 PM, at "non-peak" service. In this example, "peak" service may have a higher priority than "non-peak." Further, it is appreciated that a schedule of service may also have scheduled down times, e.g. 6:00 PM-8:00 AM. Thus, adherence to the schedule of service can be used as a performance metric to gauge whether the application provider is honoring the terms of the SLA. It is envisioned that the schedule of service can be defined by a number of different entities, including the application licensee, the application provider, an IT manager, and various other users.

Once the service manager assigns a schedule of service to an application, the service manager can propagate the schedule of service throughout the service model. In some embodiments, the nodes in the service model are represented by a plurality of data structures. The elements of the data structure may include the parent node and children nodes of a particular node and a schedule of service for the particular node. It is appreciated that a node may be comprised of additional elements as well. When a node is created a schedule of service may be allocated but left undefined. Thus, when the service manager propagates a schedule of service to a particular node from a parent or child node, the service manager can set the undefined schedule equal to the inherited schedule. Similarly, when a user assigns a schedule to a node, the service manager may set the undefined schedule of service equal to the assigned schedule of service. Moreover, if a node receives a plurality of schedules, the service manager can merge the schedules of service and set the schedule of service equal to the merged schedule of service.

Figure 4:
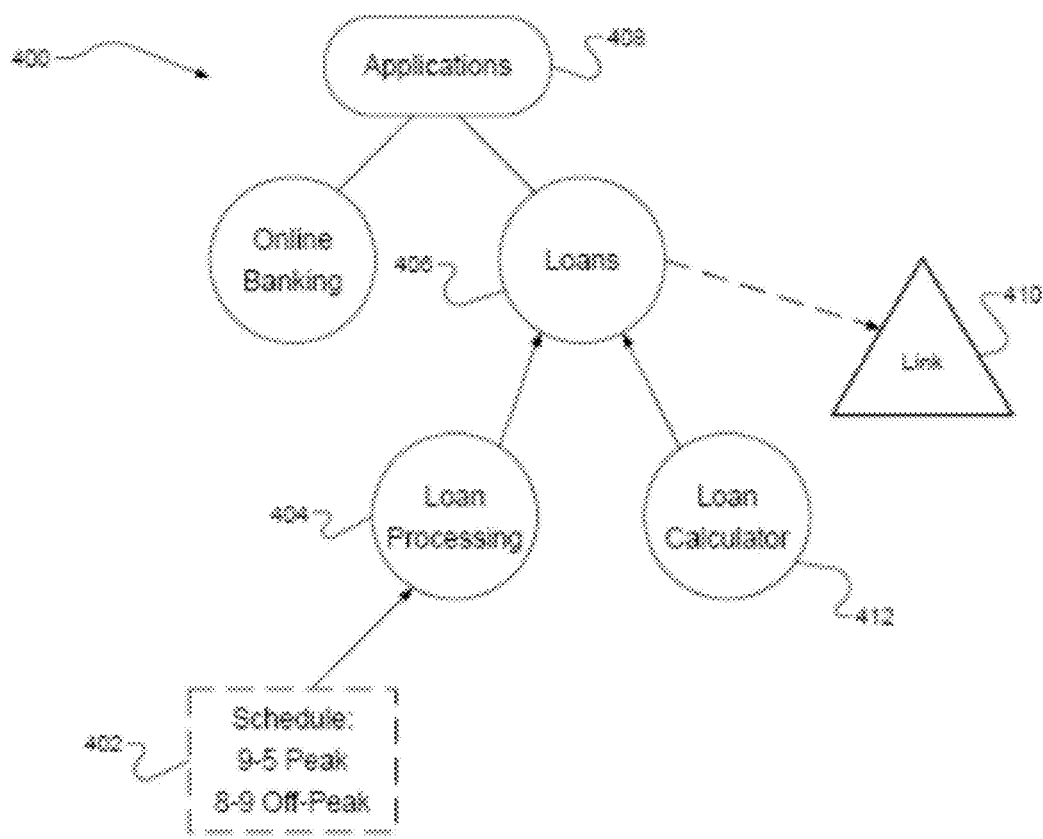
FIG. 4 is a diagram illustrating how a schedule of service may be propagated thorough an application tree of a service model.

The service manager can propagate the schedule of service through the application tree 310 of the service model 300, as well as the infrastructure tree 303 of the service model 300. FIG. 4 depicts an exemplary application tree 400 and a schedule of service 402 being propagated through the application tree 400. As can be seen, the schedule of service 402 is assigned to the node 404 representing a loan processing application. The schedule of service 402 is propagated to the node 406 representing loan applications by the service manager. The schedule of service may also be propagated to the root node 408 representing all. Further, as can be appreciated, a second schedule of service may be assigned to on-line banking applications. In this scenario, the service manager will propagate the second schedule of service throughout the service model as well. If the root node 408 representing the collection of applications is configured to receive one or more schedules of service, then the schedules of service for on-line banking applications and loans may be merged. Similarly, in this example, the node 408 representing loan applications may inherit a schedule of service from the node 412 representing a loan calculator application. In this case, the schedules of service from the loan calculator and the loan processing applications may be merged to generate a schedule of service for the loan applications. The concept of merging schedules of service is described in greater detail below. Furthermore, the schedule of service 402 is propagated, via the link 410, to the infrastructure tree (not shown).

Figure 5:
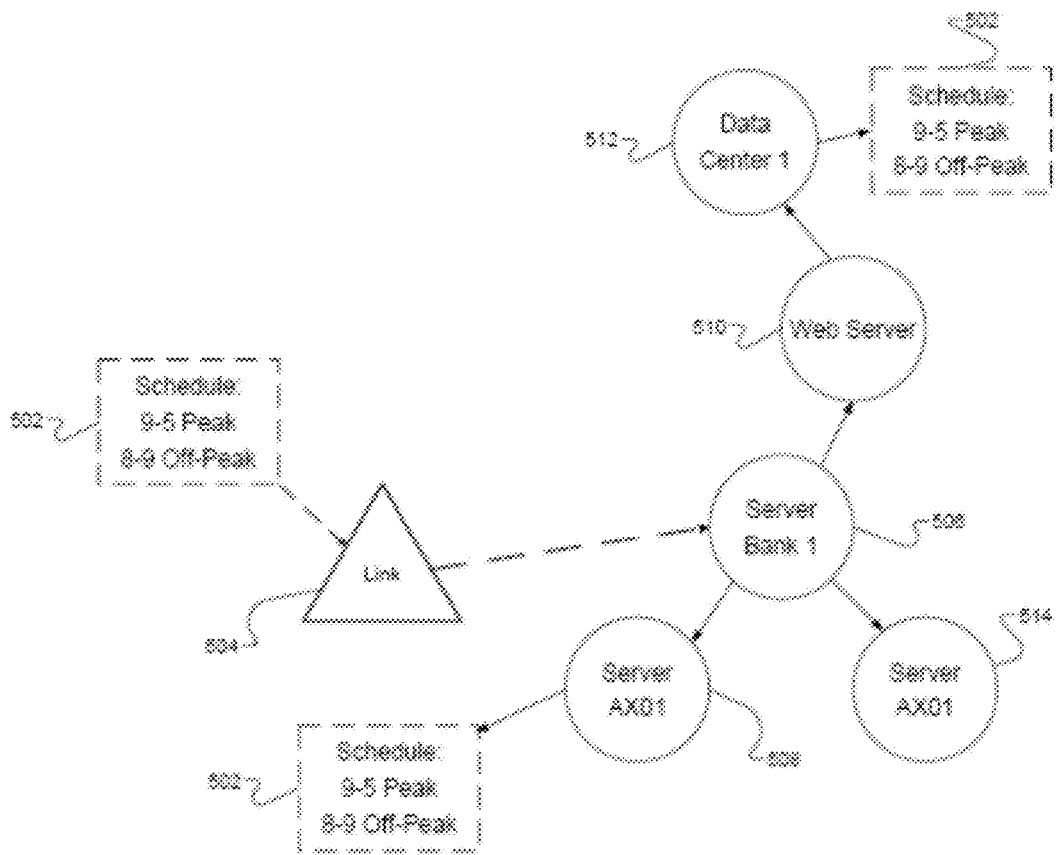
FIG. 5 is a diagram illustrating how a schedule of service may be propagated through an infrastructure tree of a service model.

FIG. 5 illustrates an exemplary infrastructure tree 500 and a schedule of service 502 being propagated through the infrastructure tree 500. As can be appreciated, the schedule of service 502 is propagated from the application tree (not shown) to the infrastructure via the link 504. In this example, the schedule of service is propagated to the node 506 representing server bank 1. The server bank 1 includes two servers, represented by nodes 508 and 514. In this example, the schedule of service 502 is propagated to nodes 508 and 514. As can be appreciated, this may be because server AX01 and server AX02 are responsible for serving the applications that are served by server bank 1. If, however, the link is linked to server AX01, then the schedule of service 502 would be propagated to the node 506 representing server bank 1, but not to the node 515 representing server bank AX02. The service manager further propagates the schedule of service 502 from the node 506 representing the server bank to the node 510 representing the web server 510, and then to the node 512 representing data center 1. As can be appreciated, if a node inherits a schedule of service from two separate nodes, e.g. the web server node 510 inheriting from server bank 1 node 508 and server bank node 2 (not shown), the service manager may be configured to merge the two schedules of service.

Figure 6:
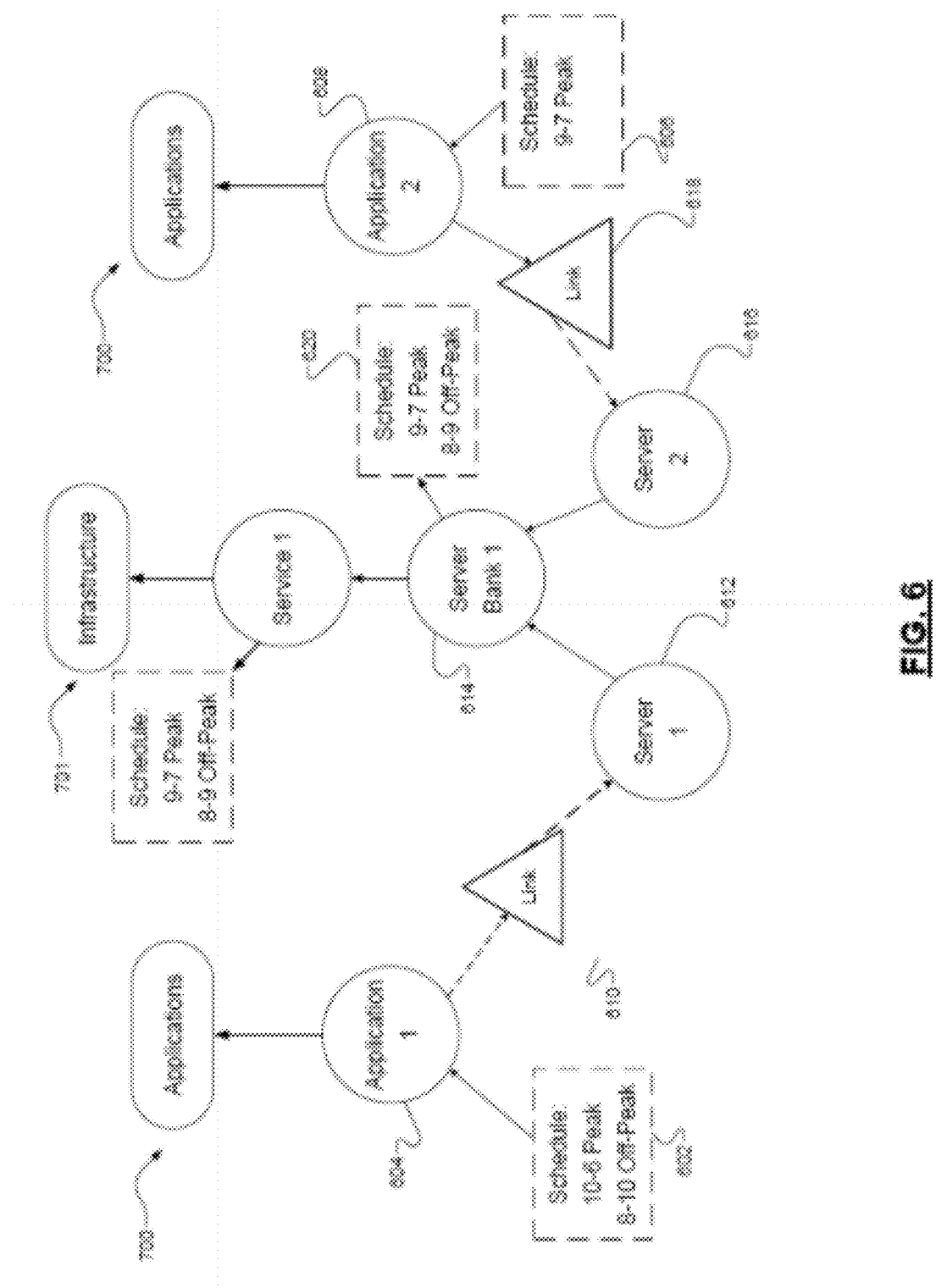
FIG. 6 is a diagram illustrating how multiple schedules of service may be propagated throughout the service model.

FIG. 6 illustrates an example of two schedules of service being merged. In this example, the application tree 600 has been broken up into two parts for purposes of illustration. According to the figure, a first schedule of service 602 is assigned to the node 604 representing a first application. A second schedule of service 606 is assigned to the node 608 representing a second application. The first application is run on a first server, represented by node 612. A first link 610 links the first application node 604 to the first server node 612. As can be seen, the first schedule of service is propagated to the first server node 612 via the first link 610. Similarly, the second schedule of service 606 is propagated to a node 616 representing a second server via a second link 618.

As can be seen from the figure, both the first server and the second server are in a first server bank, which is represented by node 614. According to this example, the server bank node 614 inherits the schedules of the first server node 612 and the second server node 618. As can be seen, the two schedules are merged such that the new schedule of service 620 of server bank 1 is off peak from 8:00AM-9:00AM and peak from 9:00AM-7:00PM. As can be appreciated from this example, peak service is given higher priority over off-peak service. Thus, when the schedules of service are merged, any overlap between peak and non-peak service is resolved in favor of the schedule entry having higher priority, e.g. peak service.

Figure 7A:
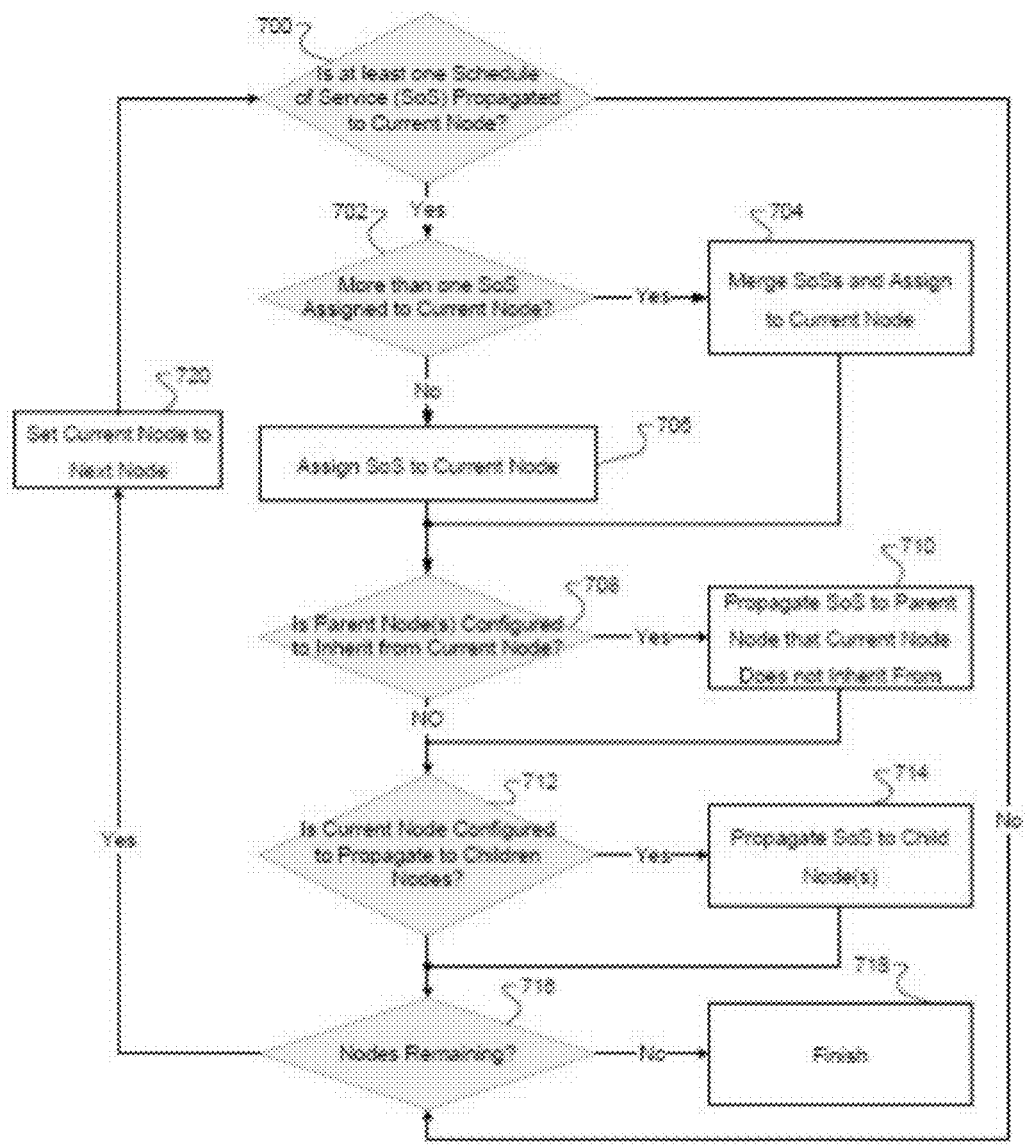
FIG. 7A is a flow chart illustrating an exemplary method for propagating a schedule of service through the service model.

FIG. 7 illustrates an exemplary method for propagating a schedule of service throughout a service model. As mentioned, a user such as an IT manager can assign a schedule of service to a software application or a node in the application tree. It is appreciated that in an application tree, there may be a plurality of different schedules assigned to different nodes. The method of FIG. 7 illustrates an exemplary method to propagate the schedules of service throughout the service model. It is appreciated that the following is not intended to be limiting, as other means of propagating a schedule of service throughout a service model are contemplated and within the scope of this disclosure.

The service manager may start at an application node that is assigned a schedule of service and may propagate the schedule of service until the schedule of service being propagated cannot be further propagated. The service manager can then move to the next application having a schedule of service assigned thereto and repeat the foregoing. It is appreciated that as the schedules of service are propagated throughout all of the nodes of the service model, the service manager may merge two or more schedules of service if a node receives more than one schedule of service. In essence, the service manager is propagating a schedule of service assigned to the software application to a plurality of computing components that support the software application. When the schedules of service have been propagated, the service manager can determine a schedule of service for a given computing component in the computing infrastructure by aggregating schedules of service propagated to the given computing component.

As described, a service model may be comprised of a plurality of nodes representing various elements in a computing hierarchy including software applications and a computing infrastructure. The nodes may be configured by a user when a corresponding component is added to the system. When a node is added, the node may be configured with inheritance rules. The inheritance rules can define from which nodes the configured node inherits properties from. For example, an inheritance rule can define whether a node will inherit a schedule of service from one of its parent nodes. For instance, an infrastructure node may inherit a schedule of service from a link node, but not from a different parent node. In addition to, or in lieu of inheritance rules, a node may have propagation rules that govern how a node propagates a schedule of service. The propagation rules may define whether a node propagates a property to its parent or to its children.

As can be appreciated, a schedule of service can be directly assigned to a node or the schedule of service can be inherited from another node. Thus, the service manager will first look to whether a schedule of service has been assigned to the current node, either by direct assignment or by inheritance, as shown at step 702. If a schedule of service has not been assigned to or inherited by the node, the service manager moves on to the next node, as shown at step 720. It is appreciated that the service manager can select a next node by reading in a parent node or a child node of the current node to find a schedule of service.

If, however, at least one schedule of service has been assigned to the node, the service manager will determine whether multiple schedules of service have been assigned to or inherited by the node, as depicted at 702. If more than one schedule of service has been assigned to or inherited by the node, the schedules of service are merged and assigned to the node as that node's schedule of service, as shown at 704. If there is only one schedule of service assigned to or inherited by the current node, then the single schedule of service is set to the schedule of service of the node, as shown at 706.

Once the schedule of service of a particular node has been determined, the service manager can propagate the schedule of service of the node to other nodes. In exemplary embodiments, the service manager operates in a breadth first manner. The service manager will examine the inheritance properties of the nodes that are connected to the current node to determine to which node the schedule of service should be propagated. Generally, the service manager will follow the inheritance rules of the nodes, with a caveat. The exception to the inheritance rule is that if the current node does not inherit from one or more of its parents nodes, the service manager will propagate the schedule of service to the parent nodes that it does not inherit from. Thus, the service manager will determine which nodes are parent nodes to the current node and will determine which of the parent nodes the current node is not configured to inherit from, as shown at step 708. The service manager will propagate the schedule of service from the current node to the parent nodes that the current node does not inherit from, as shown at step 710. To propagate the schedule of service the service manager can copy the schedule of service into the data structure representing the parent node. If the parent node already has a schedule of service assigned thereto, the service manager can merge the schedules of service.

The service manager will also determine if a schedule of service is to be propagated to the children nodes, as shown at step 712. The service manager can use the inheritance properties of the children nodes or can use the propagation rules of the current node, if so configured, to determine if the children nodes inherit from the parent node. If a child node is to inherit the schedule of service from the current node, the service manager will propagate the schedule of service of the current node to the child node, as depicted at step 714. To propagate the schedule of service to a child node, the service manager can copy the schedule of service into the data structure representing the child node. If the child node already has a schedule of service assigned thereto, the service manager can merge the schedules of service.

Figure 7B:
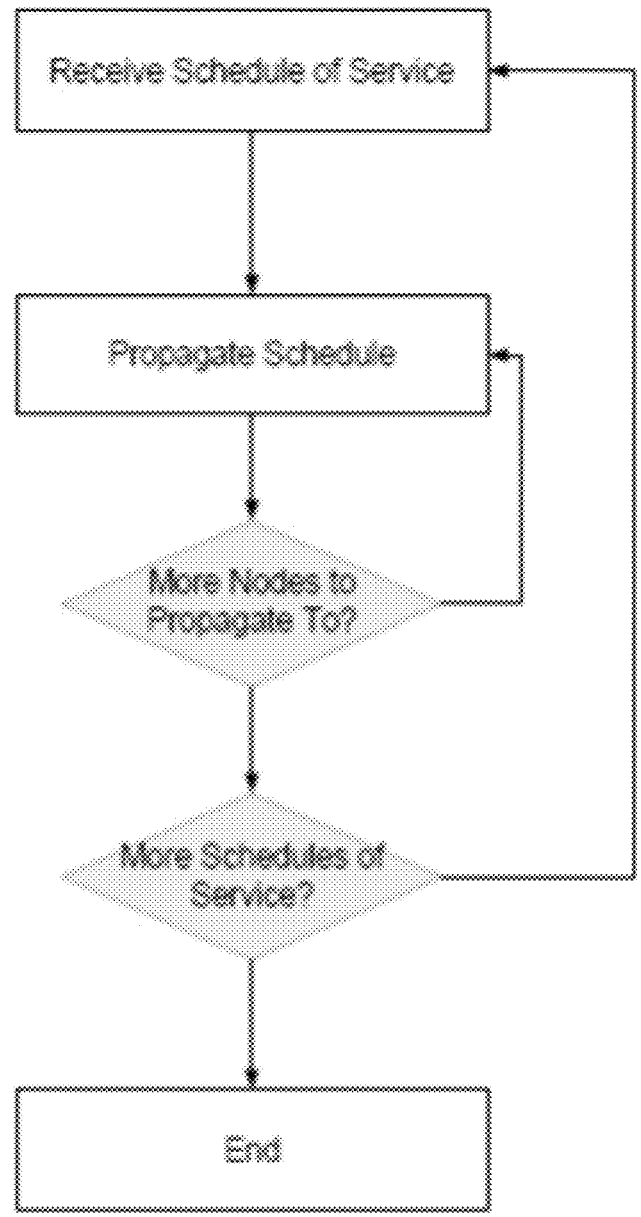
FIG. 7B is a flow chart illustrating an exemplary method for propagating a plurality of schedules of service throughout the service model.

Once the service manger has finished propagating the schedule of service from the current node, the service manager can move on to the next node, as shown at 720. As discussed above, the service manager will propagate a schedule of service until it cannot be propagated. FIG. 7B illustrates an exemplary method for propagating a plurality of schedules of service. The service manager can begin at any of the assigned schedules of service, as shown at step 750. As discussed above, the schedule of service is propagated to all nodes that are to inherit the schedule of service. This can be achieved in a breadth first manner, meaning that the service manager starts at the node that is assigned the calendar, and moves to all of the children and parent nodes before moving on to the grandchildren or grandparent nodes. The service manager will go through all of the nodes until the schedule of service can no longer be propagated, as shown at 752 and 754. Once the schedule of service can no longer be propagated throughout the service model, the service manager will move on to the next schedule of service, as shown at 756. Once all of the schedules of service have been propagated throughout the service model, the method can stop executing, as shown at 758.

Figure 8:
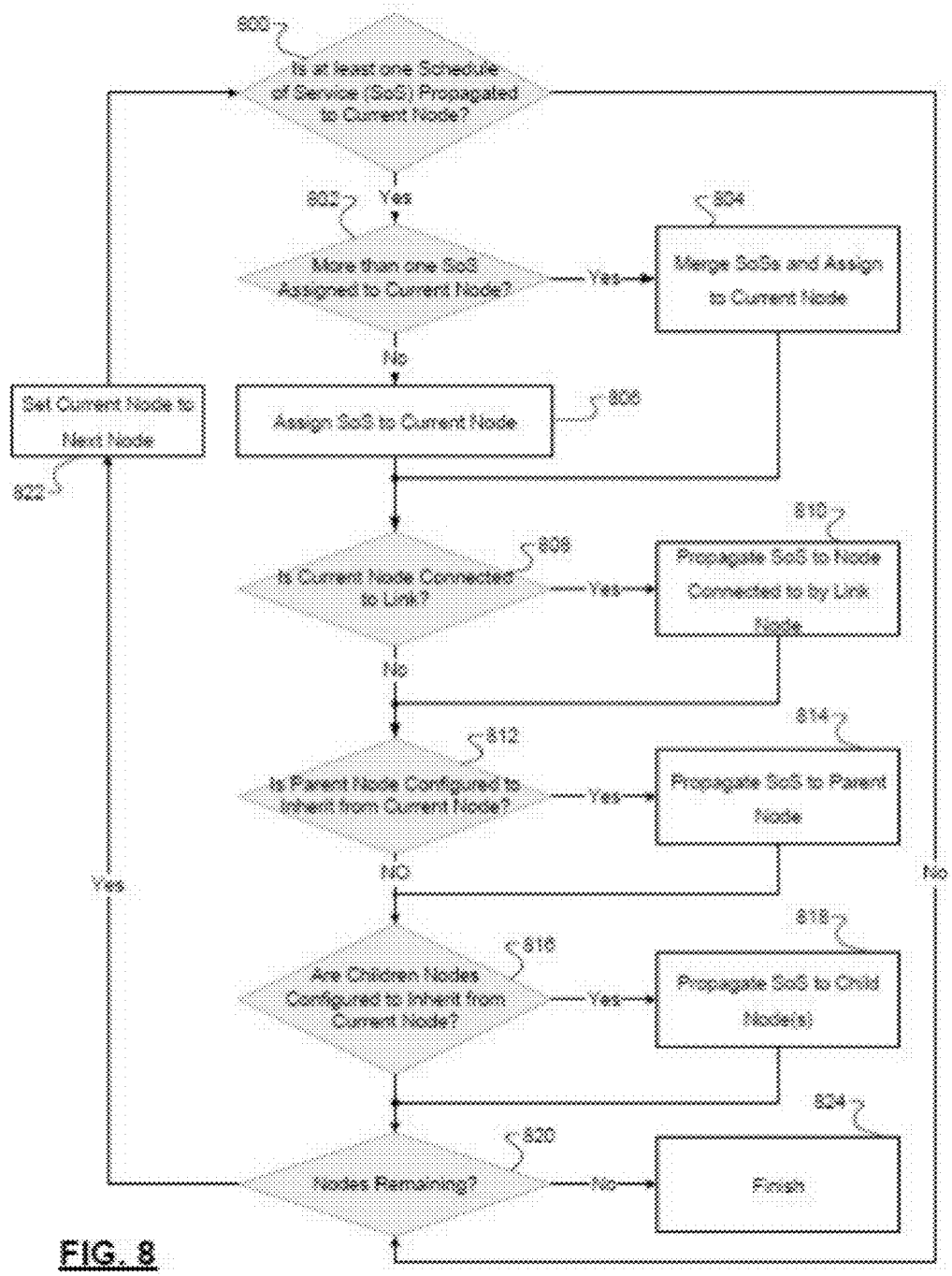
FIG. 8 is a flow chart illustrating an exemplary method for propagating a schedule of service through the service model.

FIG. 8 depicts an alternative method for propagating a schedule of service through the service model. In the alternative embodiments, the service manager can look to the propagation rules of a current node and/or the inheritance rules of the parent and children nodes to propagate the schedule of service. In these embodiments, a user can hard code each node's inheritance properties and/or propagation rules into the node and the service manager will propagate the schedules of service according to each node's configuration. Similar to the method described above, the service manager will first determine if the current node has more than one schedule of service assigned thereto, as shown at 802. If so, the service manager will merge the multiple schedules, as shown at 804. If there is only one schedule of service assigned to the node, then the schedule of service of the current node is set equal to the schedule of service. Similar to the method of FIG. 7A, the service manager can propagate the schedule in a breadth first manner. Further, while a breadth first approach is contemplated, it is appreciated that the service manager can propagate the schedules of service using other algorithms, e.g. depth first.

Once the schedule of service for the current node is determined, the service manager can propagate the current node's schedule of service to other nodes. For instance, if a node is an application node and is connected to an infrastructure node via a link, then the service manager can propagate the schedule of service to the infrastructure node, as shown at steps 808 and 810. These steps can be performed to propagate a schedule of service from the application tree to the infrastructure tree. Furthermore, it is appreciated that a link node may be used to propagate a schedule of service from the application tree to the infrastructure tree. In these embodiments, the application node may be connected to the infrastructure node via a link node and the service manager can be configured to propagate the schedule of service from the application node to the infrastructure node via the link node.

As discussed, each node may be configured with its own inheritance and/or propagating properties. Thus, the service manager can examine the inheritance properties of the parent and children nodes of the current node to determine if the current node will propagate the schedule of service thereto. For instance, the service manager can determine if a parent node is configured to inherit from the current node, as shown at 812. If the parent node is configured to inherit a schedule of service from the current node, then the service manager will propagate the schedule of service to the parent node, as shown at step 814. Similarly, the service manager may determine whether the child node or nodes is/are configured to inherit from the current node, as shown at step 816. If the children nodes are configured to inherit from the current node, the service manager will propagate the schedule of service from the current node to the children nodes, as shown at step 818.

Alternatively, the service manager may determine what the propagation rules of the current node are. In these embodiments, the service monitor will look to the current node's configuration to determine where the schedule of service should be propagated. It is appreciated that other schemes for propagating a schedule of service may also be used.

Figure 9:
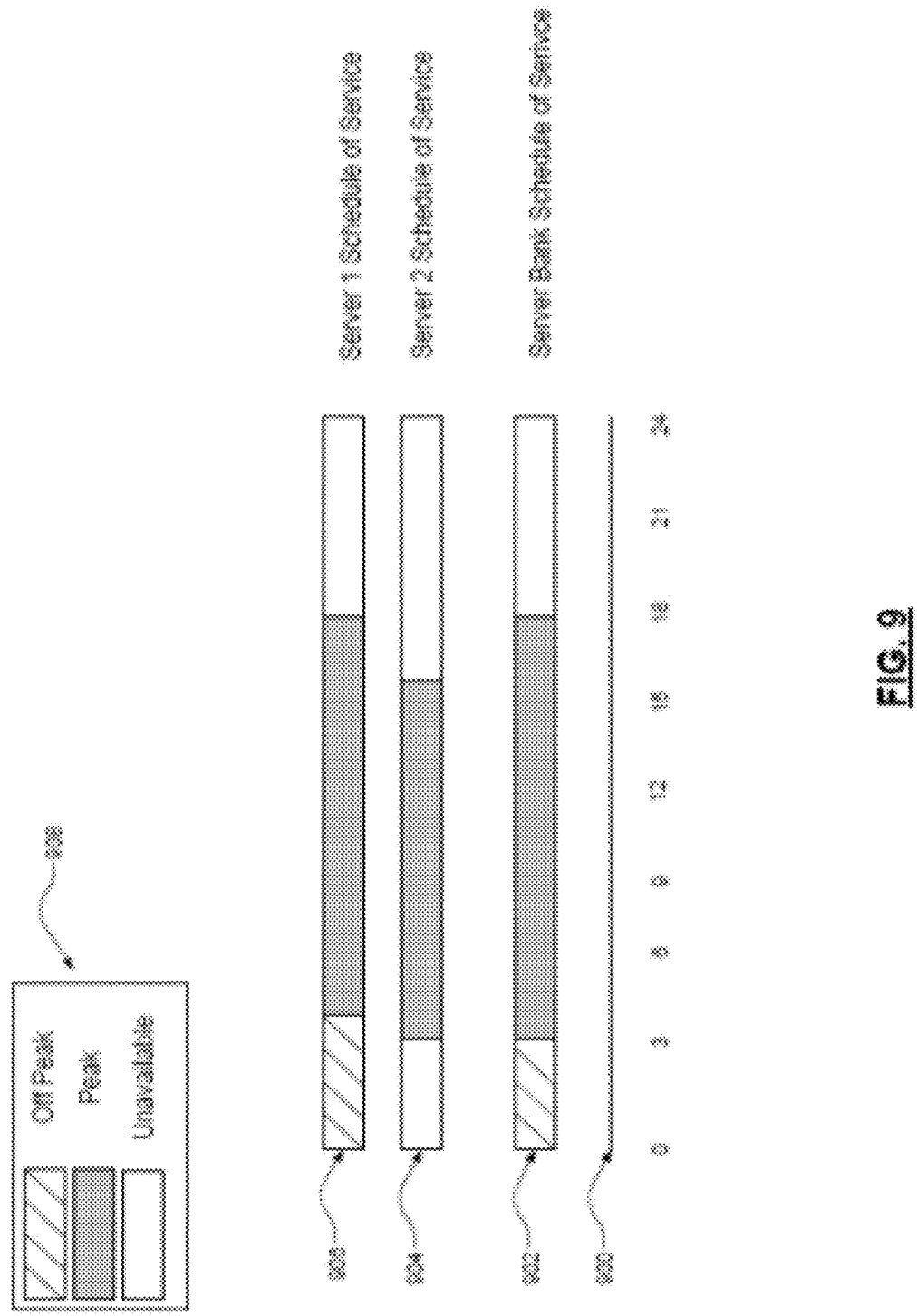
FIG. 9 is a diagram illustrating the merging of two schedules of service into a merged schedule of service.

As discussed above, if more than one schedule of service is propagated to a node, the schedules of service may be merged. FIG. 9 illustrates an example of merging schedules according to priority. In this example, peak hours are given priority over non-peak hours. Generally, the priorities of schedule entries can be predefined by a user. As shown in key 908, the peak hours are represented by a solid block, the non-peak hours are represented by the striped block, and the unavailable hours are represented by an unmarked block. It is appreciated that there may be more or less designations. For example, peak hours may have priority over intermediate-peak, which have priority over non-peak hours.

In FIG. 9, two schedules of service 904 and 906 are being merged to result in a merged schedule of service 902. In this example, the first schedule of service 906 designates a non-peak time from 12:00AM to 4:00AM, a peak time from 4:00AM to 6:00PM, and an unavailable time from 6:00PM to 12:00AM. The second schedule of service 904 is peak from 3:00AM to 4:00PM. The schedules of service in this example are merged in accordance to their priorities, resulting in a schedule of service 902 for a node which designates 12:00AM to 3:00AM as non-peak hours, and 3:00AM to 6:00PM as peak, and unavailable from 6:00PM to 12:00AM as unavailable hours. Thus, if a node were to inherit the two schedules of service shown in the example, the resulting schedule of service would be the merged schedule of service 902.

Figure 10:
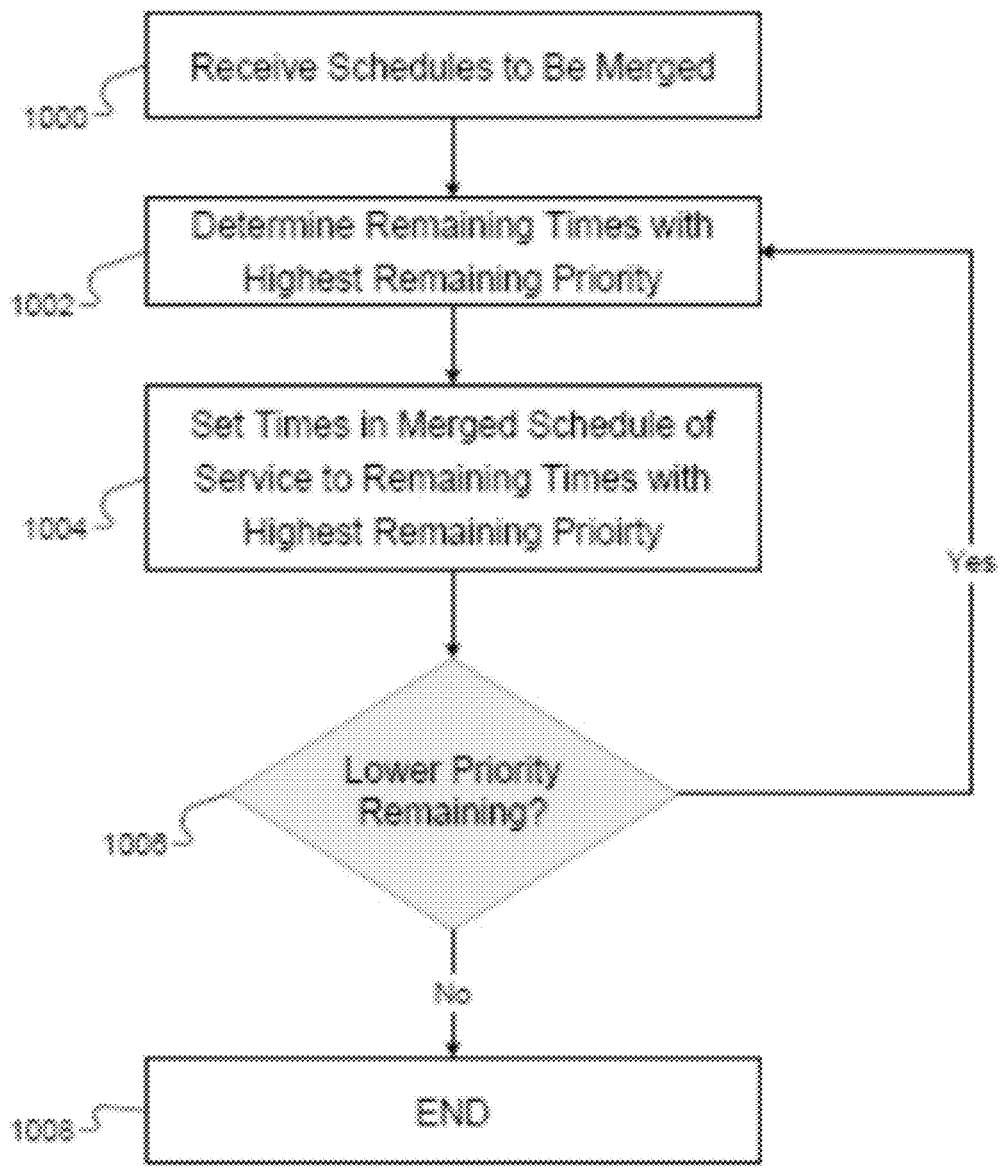
FIG. 10 is a flow chart illustrating an exemplary method for merging multiple schedules of service.

FIG. 10 illustrates an exemplary method for merging schedules of service according to priorities. The illustrated method assumes that more than one schedule of service is received and that the schedules of service have priorities associated thereto. A priority may indicate a hierarchy of schedule elements. For instance, a "peak" time may indicate a time where service is guaranteed to exceed a particular quality of service threshold, and a "non-peak" time may require a lesser quality of service.

Upon receiving two schedules of service that are to be merged, the service manager can determine what the highest priority is, as shown at step 1004. In the example provided above, the service manager in a first pass will determine that the "peak" schedule entries have the highest priority. The service manager can then populate a new schedule of service, i.e. the merged schedule of service, with the entries of the received schedules of service having the highest priority, as shown at step 1006. The service manager will then determine if there are any other lower priority schedule entries, as shown at 1008. If so, the service manager will then repeat the foregoing, with the caveat that a schedule entry with higher priority cannot be overwritten by a schedule entry with a lower priority. This process is repeated until there are no more lower priority entries remaining.

The foregoing method is but one way to generate a merged schedule of service. It is appreciated that other methods may be implemented. For instance, in some embodiments the service manager can begin with the lowest priority entries and populate the schedule of service with the lowest priority entries first. On each successive pass, the merged schedule of service may be updated with the higher priority entries, wherein the higher priority entries overwrite lesser priority entries.

In some embodiments, the schedules of services may be initially assigned to a location instead of an application. For instance, in an interoffice computing environment spanning over a plurality of time zones, a particular application may be available from 9:00AM-5:00PM EST in New York, and 9:00AM-5:00PM PST in Los Angeles. It is appreciated that in these instances, the schedules of service may be converted into a common time, e.g. Greenwich Mean Time or Eastern Standard Time, and the schedules of service may be propagated as described above.

Figure 11:
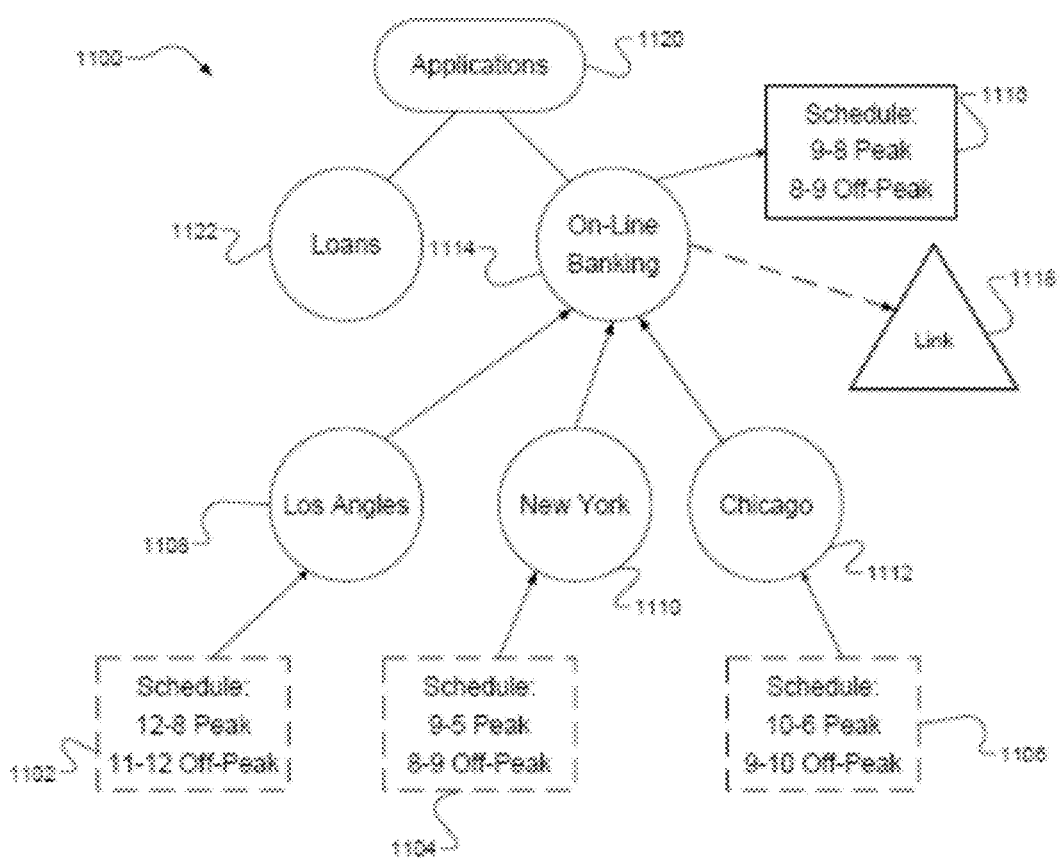
FIG. 11 is a diagram illustrating how a schedule of service can be assigned to a location and propagated through an application tree.

FIG. 11 shows an exemplary service model where schedules of service are assigned to one or more locations. In the example provided, three nodes 1108, 1110, and 1112 representing a Los Angeles office, a New York office, and a Chicago office, respectively, are served an on-line banking application during business hours, that is 9:00 AM to 5:00 PM in each office's respective time zones. Furthermore, the banking software may be available at a non-peak time of 8:00 AM-9:00 AM in each respective time zone. In this example, the schedules of service are propagated up to the common parent on-line banking node 1114 and merged. The merged schedule of service 1116 is then propagated to the link node 1118, which may then be propagated to an infrastructure node (not shown). As can be appreciated, the merged schedule of service 1116 may also be propagated to the application tree root node 1120. The merged schedule of service 1116 would not, however, be propagated to the loan application node 1122.

Once the schedules of service are propagated throughout the application tree and the infrastructure tree, it is appreciated that the service manager can display to a user, such as an IT manager, how the computing infrastructure is being used. The schedules of service for the various components can also be used to track when an interruption of service has occurred and whether the interruption violates an SLA. The performance tool may display the schedules of service for the components via a user interface. Alternatively, the service model with associated schedules of service may be displayed via the user interface.

It is understood that the various components of the performance management tool, including the service manager, can be embodied as computer readable instructions residing a computer readable medium and executable by a processor such that the computer readable instructions cause the processor to perform the methods described herein. It is appreciated that the computer readable medium can be any form of volatile or non-volitile memory, including but not limited to RAM, ROM, CD-ROM, DVD-ROM, Flash memory, a Hard disc drive, or any other computer memory now known or later developed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of scheduling availability for a computing infrastructure in a shared computing environment, comprising:

receiving, at a computing device having one or more microprocessors, a service model including an application graph and an infrastructure graph, the application graph having a plurality of application nodes defining a hierarchy of software applications and the infrastructure graph having a plurality of infrastructure nodes defining a hierarchy of computing components, wherein a specific application node representing a specific software application in the application graph is linked to one or more specific infrastructure nodes in the infrastructure graph by one or more links, the one or more specific infrastructure nodes representing one or more specific computing components in the hierarchy that support the specific software application;

receiving, at the computing device, a new schedule of service for the specific software application represented by the specific application node;

loading, at the computing device, the application graph, the infrastructure graph, and the new schedule of service into a memory of the computing device;

assigning, at the computing device, the new schedule of service to the specific application node representing the specific software application in the computing environment;

propagating, at the computing device, the new schedule of service assigned to the specific application node to the one or more specific infrastructure nodes linked to the application node;

propagating, at the computing device, the new schedule of service to another infrastructure node in the infrastructure graph according to a predetermined inheritance rule; and determining, at the computing device, an aggregated schedule of service for a given computing component in the computing infrastructure represented by the other infrastructure node by aggregating one or more schedules of service propagated to the other infrastructure node representing the given computing component, the one or more schedules of service including the new schedule of service.

2. The method of claim 1 wherein each of the links indicates a particular computing component of the plurality of computing components that hosts the software application.

3. The method of claim 1 wherein the new schedule of service is propagated to a particular application node in the application graph or a particular infrastructure node in the infrastructure graph from a parent node in the application graph or the infrastructure graph unless the parent node is configured to inherit the new schedule of service from the particular application node or the particular infrastructure node.

4. The method of claim 1 wherein the new schedule of service defines at least one period of availability of the software application and a priority corresponding to the software application during the period of availability.

5. The method of claim 4 wherein a first schedule of service having a first period of availability and a first priority and a second schedule of service having a second period of availability and a second priority are aggregated by combining the first period of availability and the second period of availability, wherein a conflict between the first period of availability and the second period availability is resolved in favor of the period of availability having a higher priority.

6. A method of scheduling service for a computing infrastructure in shared computing environment, comprising:

receiving, at a computing device having one or more microprocessors, a service model comprising an application graph and an infrastructure graph, the application graph having application nodes defining a hierarchy of applications and the infrastructure graph having infrastructure nodes defining a hierarchy of computing components, wherein a specific application node representing a specific application in the application graph is linked to a specific infrastructure node in the infrastructure graph by a link, the specific infrastructure node representing a specific computing component that supports the specific application;

receiving, at the computing device, a new schedule of service for the application represented by the application node;

loading, at the computing device, the application graph, the infrastructure graph, and the new schedule of service into a memory of the computing device;

assigning, at the computing device, the new schedule of service to the application node representing the application;

propagating, at the computing device, the new schedule of service to the specific infrastructure node representing the specific computing component that supports the specific application;

propagating, at the computing device, the new schedule of service to another infrastructure node in the infrastructure graph;

determining, at the computing device, an aggregated schedule of service for a another computing component in the hierarchy of computing components by aggregating one or more schedules of service propagated to the other infrastructure node, the one or more schedules of service including the new schedule of service.

7. The method of claim 6 wherein the new schedule of service is propagated to different nodes in the infrastructure graph according to a predetermined inheritance rule.

8. The method of claim 7 wherein the predetermined inheritance rule is that a given node inherits the new schedule of service from a parent node of the given node unless parent node of the given node is configured to inherit from the given node.

9. The method of claim 6 wherein each node in the service model is preconfigured with a corresponding propagation rule and the new schedule of service is propagated throughout the service model according to the propagation rules of the nodes in the service model.

10. The method of claim 6 further comprising merging the new schedule of service with a different schedule of service when an inheriting node inherits the new schedule of service and the different schedule of service.

11. The method of claim 10 wherein the new schedule of service and the different schedule of service are merged according to a first priority indicated in the new schedule of service and a second priority indicated in the different schedule of service.

12. The method of claim 6 wherein the specific application node in the application graph links to the specific infrastructure node in the infrastructure graph via a link node, wherein the new schedule of service is propagated from the specific application node to the specific infrastructure node via the link node.

13. A method for scheduling availability of a computing infrastructure in a shared computing environment, comprising:

receiving, at a computing device having one or more microprocessors, a service model comprising an application graph having application nodes defining a hierarchy of applications and an infrastructure graph having infrastructure nodes defining a hierarchy of computing components, wherein a specific application node in the application graph representing a specific application links to a specific infrastructure node in the infrastructure graph representing a specific computing component that supports the specific application via a link node;

receiving, at the computing device, a new schedule of service for the specific application, wherein the new schedule of service indicates a time when the specific application is available to a user and a priority of the specific application;

loading, at the computing device, service model and the new schedule of service into a memory of the computing device;

assigning, at the computing device, the new schedule of service to the specific application node representing the application;

propagating, at the computing device, the new schedule of service to the specific infrastructure node according a predetermined rule, wherein the new schedule of service is propagated to the specific infrastructure node via the link node;

propagating the schedule of service to another node in the infrastructure graph according to the predetermined rule, the other node representing another computing component; and aggregating, at the computing device, one or more schedules of service that were propagated to the other infrastructure node to obtain an aggregated schedule of service for the other computing component, the one or more schedules of service including the schedule of service assigned to the application node.

14. The method of claim 13 wherein a node in either the application graph or the infrastructure graph is either configured to inherit from a parent node of the node or the parent node is configured to inherit from the node.

15. The method of claim 14 wherein the predetermined rule is that the node will inherit the schedule of service from the parent node unless the parent node is configured to inherit from the node.

* * * * *